United States Patent [19]

Friedrich

[11] Patent Number: 4,677,874
[45] Date of Patent: Jul. 7, 1987

[54] TRANSMISSION, PARTICULARLY FOR CROSS-COUNTRY MOTOR VEHICLES

[75] Inventor: Karl Friedrich, Leibnitz, Austria

[73] Assignee: Steyr-Daimler-Puch Aktiengesellschaft, Vienna, Austria

[21] Appl. No.: 840,885

[22] Filed: Mar. 18, 1986

[30] Foreign Application Priority Data

Mar. 28, 1985 [AT] Austria ............................. A 917/85

[51] Int. Cl.$^4$ ........................ F16H 37/08; F16H 3/08
[52] U.S. Cl. ................................. 74/665 GC; 74/681;
74/705; 74/740; 74/331; 74/359; 74/360
[58] Field of Search ................... 74/359, 360, 665 GA,
74/665 GB, 665 GC, 681, 740, 745, 331, 705, 356

[56] References Cited

U.S. PATENT DOCUMENTS

| | | | |
|---|---|---|---|
| 2,479,838 | 8/1949 | Huston | 74/665 GA |
| 2,835,143 | 5/1958 | Kelbel | 74/745 X |
| 2,972,899 | 2/1961 | Wiggermann | 74/360 X |
| 2,973,845 | 3/1961 | Sinclair | 74/361 X |
| 3,589,483 | 6/1971 | Smith | 74/681 X |
| 3,802,293 | 4/1974 | Winckler et al. | 74/740 X |
| 4,579,015 | 4/1986 | Fukui | 74/360 X |

FOREIGN PATENT DOCUMENTS

| | | | |
|---|---|---|---|
| 2244342 | 3/1974 | Fed. Rep. of Germany | 74/740 |
| 2452739 | 5/1976 | Fed. Rep. of Germany | 74/360 |
| 2644113 | 4/1978 | Fed. Rep. of Germany | 74/360 |

Primary Examiner—Allan D. Herrmann
Assistant Examiner—Martin G. Belisario
Attorney, Agent, or Firm—Kurt Kelman

[57] ABSTRACT

A transmission for a motor vehicle comprises a multi-speed change gear set comprising a plurality of loose spur gears and a plurality of fixed spur gears, each of which is permanently in mesh with one of the loose spur gears. The transmission comprises a second gear set, which is adapted to be selectively driven by the change gear set. The change gear set comprises an input shaft and two gear set output shafts. The loose spur gears for relatively low speeds are rotatably mounted on and adapted to be coupled to the first gear set output shaft. The loose spur gears for relatively high speeds are rotatably mounted on and adapted to be coupled to the second gear set output shaft. To simplify the structure and to reduce the overall size of the transmission in the direction of the input and output shafts, an additional spur gear is non-rotatably mounted on each gear set output shaft and is in mesh with a common idler gear, which is adapted to be coupled to a pinion, which is in mesh with a final output gear. The second gear set comprises a large spur gear and a small spur gear, which are adapted to be coupled to each other. The large spur gear is permanently in mesh with the additional spur gear mounted on the second gear set output shaft. The small spur gear is permanently in mesh with the final output gear. The two clutches between the idler gear and the pinion which is coaxial thereto and between the large and small spur gears can be engaged and disengaged only in mutually opposite senses.

3 Claims, 2 Drawing Figures

TRANSMISSION, PARTICULARLY FOR CROSS-COUNTRY MOTOR VEHICLES

BACKGROUND OF THE INVENTION

1. Field of the Invention

This invention relates to a transmission, particularly for cross-country motor vehicles, which transmission comprises a multispeed change gear set comprising a plurality of loose spur gears, a plurality of fixed spur gears, each of which is permanently in mesh with one of the loose spur gears, and a second gear set, which is adapted to be selectively driven by said change gear set.

2. Description of the Prior Art

By means of said selectively operable gear set, which is always a speed-reducing transmission, the number of speeds provided by the change gear set can be doubled so that, e.g., the same number of speeds is available for the relatively slow cross-country travel as for road travel at relatively high speeds. The arrangement of the selectively operable gear set behind the multispeed change gear set affords the advantage that the change gear set may consist of lighter elements than in an arrangement in which the change gear set is preceded by a selectively operable gear set because the operation of the selectively operable gear set will not result in a change of the speeds of the gears of the change gear set, which speeds are relatively high so that only relatively low torques are required. In the previous transmissions of the present kind the change gear set comprises an input shaft and an output shaft and each of said shafts carries a fixed or a loose spur gear of the change gear set. Because each shaft carries a plurality of juxtaposed spur gears and interposed clutches, the transmission has a considerable dimension in the axial direction of the shafts. This is particularly undesirable in vehicles having an engine which extends transversely to the direction of travel and is directly adjoined by a change gear set in the direction of the crankshaft of the engine. The provision of the selectively operable gear set considerably increases the total structural expenditure involved in the transmission.

SUMMARY OF THE INVENTION

It is an object of the invention to eliminate the disadvantages outlined hereinbefore and to provide a transmission which is of the kind described first hereinbefore and has a smaller dimension in the axial direction of the shafts and involves a smaller structural expenditure.

That object is accomplished in accordance with the invention in that the changed gear set comprises an input shaft and two gear set output shafts, each of the loose spur gears for relatively low speeds is rotatably mounted on and adapted to be coupled to the first gear set output shaft, each of the loose spur gears for relatively high speeds is rotatably mounted on and adapted to be coupled to the second gear set output shaft, two additional spur gears are fixed to respective ones of the gear set output shafts and mesh with a common idler gear, which is adapted to be coupled to a pinion in mesh with a final output gear, the selectively operable gear set which succeeds the change gear set comprises a large spur gear and a small spur gear, which gears are adapted to be selectively coupled to each other, said large spur gear is permanently in mesh with the additional spur gear that is fixed to the second gear set output shaft, said small spur gear is permanently in mesh with the final output gear, and the two clutches respectively provided between the common idler gear and the coaxial pinion and between said large and small gears are adapted to be engaged and disengaged only in opposite senses.

Because the transmission comprises two gear set output shafts, each of which has rotatably mounted on it only part of said loose spur gears, at least one driving spur gear mounted on the input shaft can be caused to mesh with a loose gear on each of the two gear set output shafts so that one gear on the input shaft is used for two speeds of the change gear set and the overall lengths of the transmission in the direction of its shafts is reduced as desired, particularly because each of the gear set output shafts carries only part of the loose spur gears so that there is adequate space for an accommodation of the clutches on said gear set output shafts. Besides, the remaining gears, inclusive of the final output gear, are not juxtaposed in the axial direction but lie virtually only in two parallel planes so that the overall length in the axial direction of the shafts is further reduced. The structure is simplified in that the selectively operable gear set which succeeds the change gear set comprises gears which are used for the lower speeds, i.e., for a cross-country travel, as well as for road travel. It will be understood that the use of individual gears for a plurality of functions involves a good utilization of the material in the two modes of operation. Another advantage resides in that the same number of gears are used to transmit power for all speeds for road travel and for part of the speeds for cross-country travel.

Figure 1:
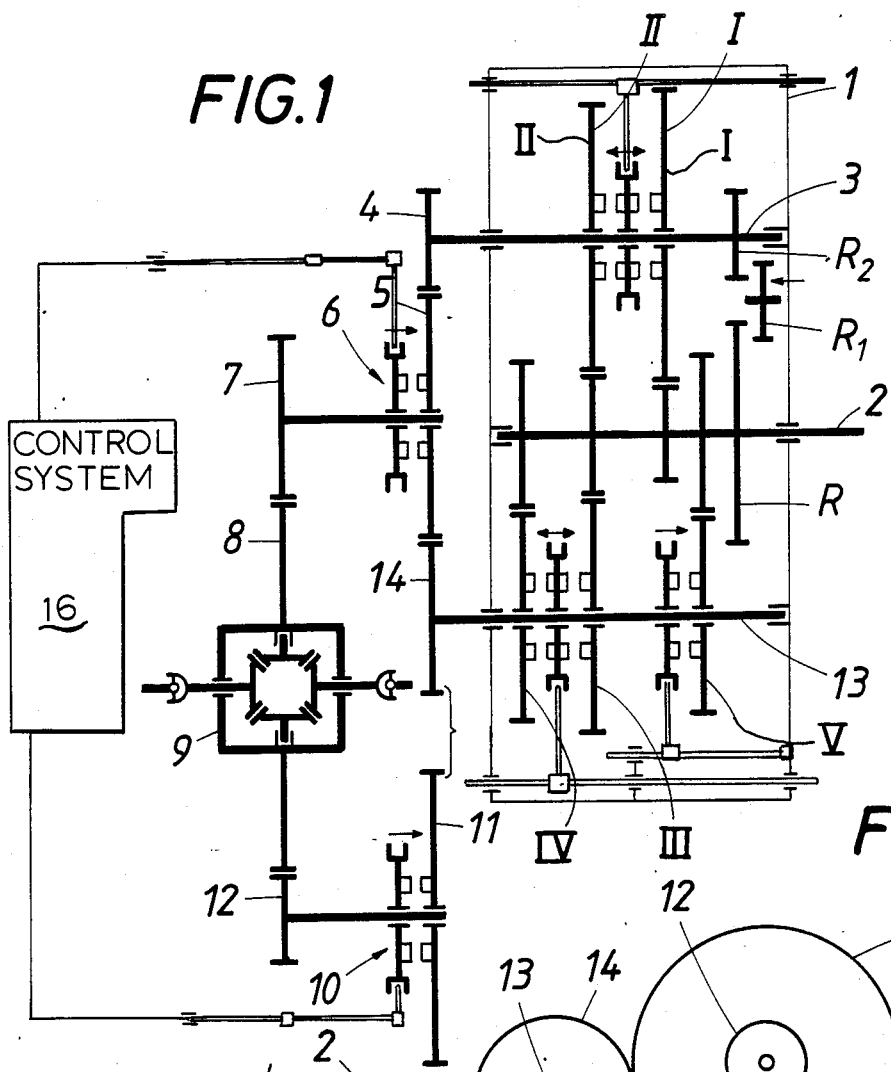
FIG. 1 shows diagrammatically the entire transmission for driving a cross-country motor vehicle.
Figure 2:
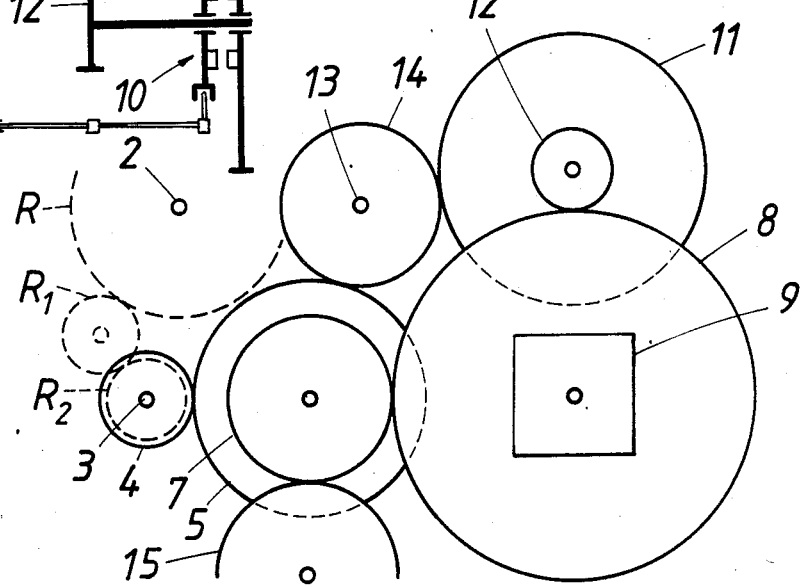
FIG. 2 is a side elevation showing the gears and shafts of the transmission.

A multispeed change gear set 1 succeeds the engine of a motor vehicle and comprises an input shaft 2 and two gear set output shafts 3, 13. The gear set 1 comprises a plurality of fixed spur gears, which are non-rotatably mounted on the input shaft 2, and a plurality of loose spur gears, which are adapted to be selectively coupled to one of the gear set output shafts 3, 13. Only the loose spur gears I, II for the first and second speeds are mounted on the first gear set output shaft 3. The loose spur gears III, IV and V for the third, fourth and fifth speeds are provided on the second gear set output shaft 13. A reverse gear R is also secured to the input shaft and is adapted to be coupled by a sliding gear $R_1$ to a spur gear $R_2$, which is secured to the first gear set output shaft 3. It will be apparent that the loose gears II and III for the second and third speeds are in mesh with a common fixed gear mounted on the input shaft so that one gear on the input shaft is provided for two speeds and the structural expenditure is correspondingly reduced. An additional spur gear 4 and 14 is non-rotatably connected to the gear set output shafts 3, 13, respectively. The two additional spur gears 4, 14 are in mesh with a common idler gear 5, which is adapted to be connected by a clutch 6 to a pinion 7, which is in mesh with a final output gear 8. The final output gear 8 is operatively connected to an axle of the vehicle by means of a differential 9.

The change gear set 1 is succeeded by a second gear set, which comprises two spur gears 11, 12, which are adapted to be coupled to each other by means of a clutch 10. The larger spur gear 11 of said spur gears 11, 12 is permanently in mesh with the additional spur gear 14 secured to the second gear set output shaft 13. The smaller spur gear 12 is permanently in mesh with the final output gear 8. The two clutches 6 and 10 are mechanically or electrically interlocked in such a manner that only one of them can be engaged at a time and that the disengagement of an engaged clutch will automatically cause the other clutch to be engaged.

During road travel the clutch 10 is disengaged so that torque is transmitted from the engine via the input shaft 2 of the change gear set 1 and the spur gears for the first and second speeds or, for reversing, the reverse gear to the first gear set output shaft 3 and further via the additional spur gear 4, the idler gear 5, the clutch 6 and the pinion 7 to the final output gear 8. For the third, fourth and fifth speeds, torque is transmitted via the second gear set output shaft 13 and the additional spur gear 14 to the idler gear 5 and transmitted from the latter to the final output shaft 8 in the manner described above. For cross-country travel the clutch 6 is disengaged so that the clutch 10 is engaged and power is now transmitted for the first, second and reverse speeds from the first gear set output shaft 3 via the spur gear 4, the idler gear 5, the additional spur gear to the spur gear 11 and via the clutch 10 and the spur gear 12 to the final output gear 8, and for the third, fourth and fifth speeds power is transmitted from the second gear shaft output shaft 13 via the spur gear 14 and the spur gears 11, 12 and the final output gear 8. It will be understood that torque can be transmitted to a second axle of the vehicle from the final output gear 8 or from the pinion 7, e.g., via the spur gear 15.

The clutch control means is conventional and comprises shift rods carrying shift forks coupled to the clutches for loose spur gears I to V. The shift rods for clutches 6, 10 are connected by a conventional control system 16, which comprises part of the clutch control means, so that one clutch is engaged when the other is disengaged, and vice versa.

I claim:

1. In a transmission comprising
   a change gear set comprising input shaft means, gear set output shaft means, a plurality of fixed spur gears non-rotatably connected to one of said shaft means, and a plurality of loose spur gears, each of which is rotatably mounted on and adapted to be selectively coupled to the other of said shaft means and permanently in mesh with one of said fixed spur gears, said loose spur gears comprising first and second groups of loose spur gears for relatively low and relatively high speeds, respectively, and
   a second gear set adapted to be selectively driven by said output shaft means,
   the improvement residing in that said input shaft means consist of an input shaft,
   said gear set output shaft means consist of first and second gear set output shafts,
   said fixed spur gears are non-rotatably mounted on said input shaft,
   said loose spur gears of said first and second groups are rotatably mounted and adapted to be coupled to said first and second gear set output shafts, respectively,
   first and second additional spur gears are non-rotatably connected to said first and second gear set output shafts, respectively,
   a common idler gear is provided, which is in mesh with both said first and second additional spur gears,
   a pinion is provided,
   a first clutch is provided for selectively coupling said pinion to said common idler gear,
   a final output gear is provided, which is permanently in mesh with said pinion,
   said second gear set comprises a large spur gear, which is permanently in mesh with said second additional spur gear, a small spur gear, which is permanently in mesh with said final output gear, and a second clutch for selectively coupling said large and small spur gears to each other, and
   clutch control means are provided, which are selectively operable in one mode to engage said first clutch and disengage said second clutch and in another mode to disengage said first clutch and to engage said second clutch.

2. The improvement set forth in claim 1 as applied to a transmission for a cross-country motor vehicle.

3. The improvement set forth in claim 1, wherein one of said fixed spur gears is permanently in mesh with two of said loose spur gears of said first and second groups, respectively.

* * * * *